Dec. 13, 1960 M. PALMER ET AL 2,963,985
SELECTIVE ELECTRIC MOTOR CONTROL SYSTEM
Filed July 1, 1957 5 Sheets-Sheet 1
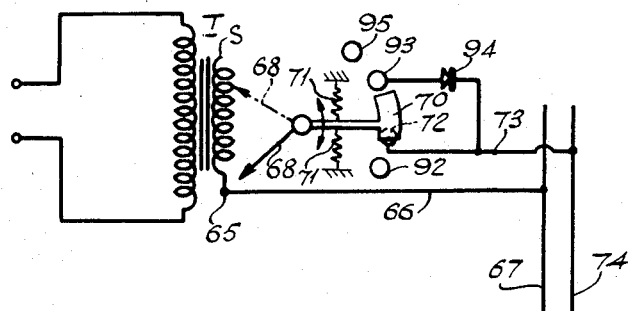
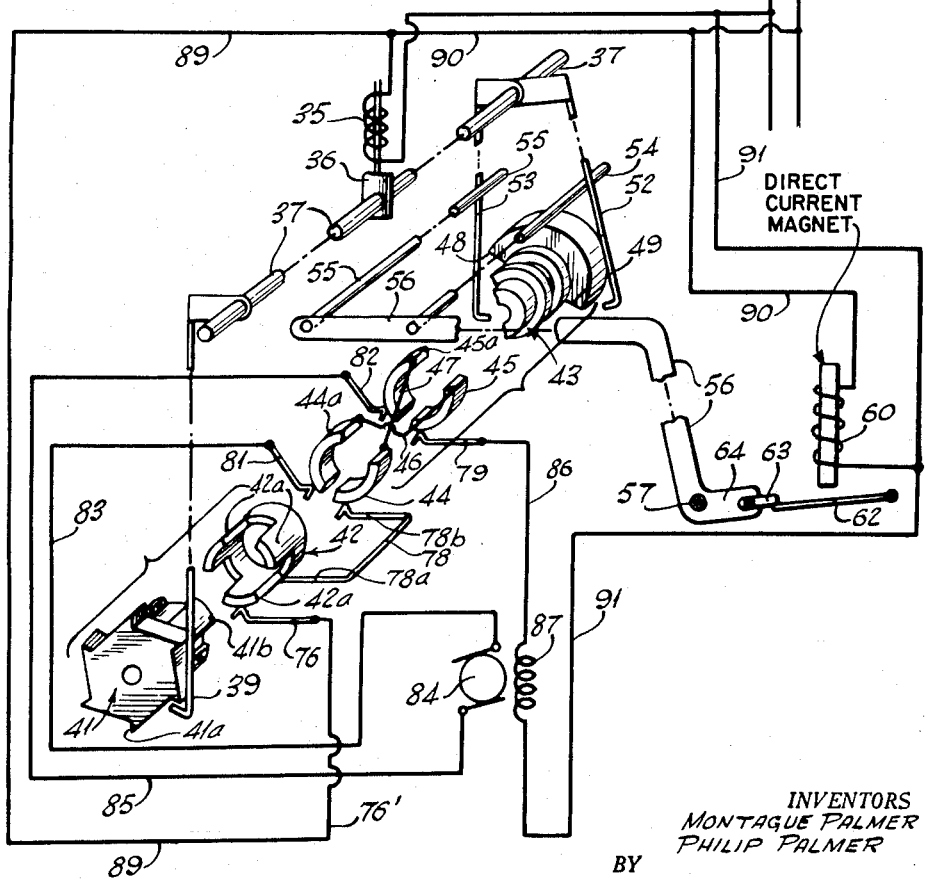
INVENTORS
MONTAGUE PALMER
PHILIP PALMER
BY
Moses, Nolte, & Nolte
ATTORNEYS Dec. 13, 1960  M. PALMER ET AL  2,963,985
SELECTIVE ELECTRIC MOTOR CONTROL SYSTEM
Filed July 1, 1957  5 Sheets-Sheet 2
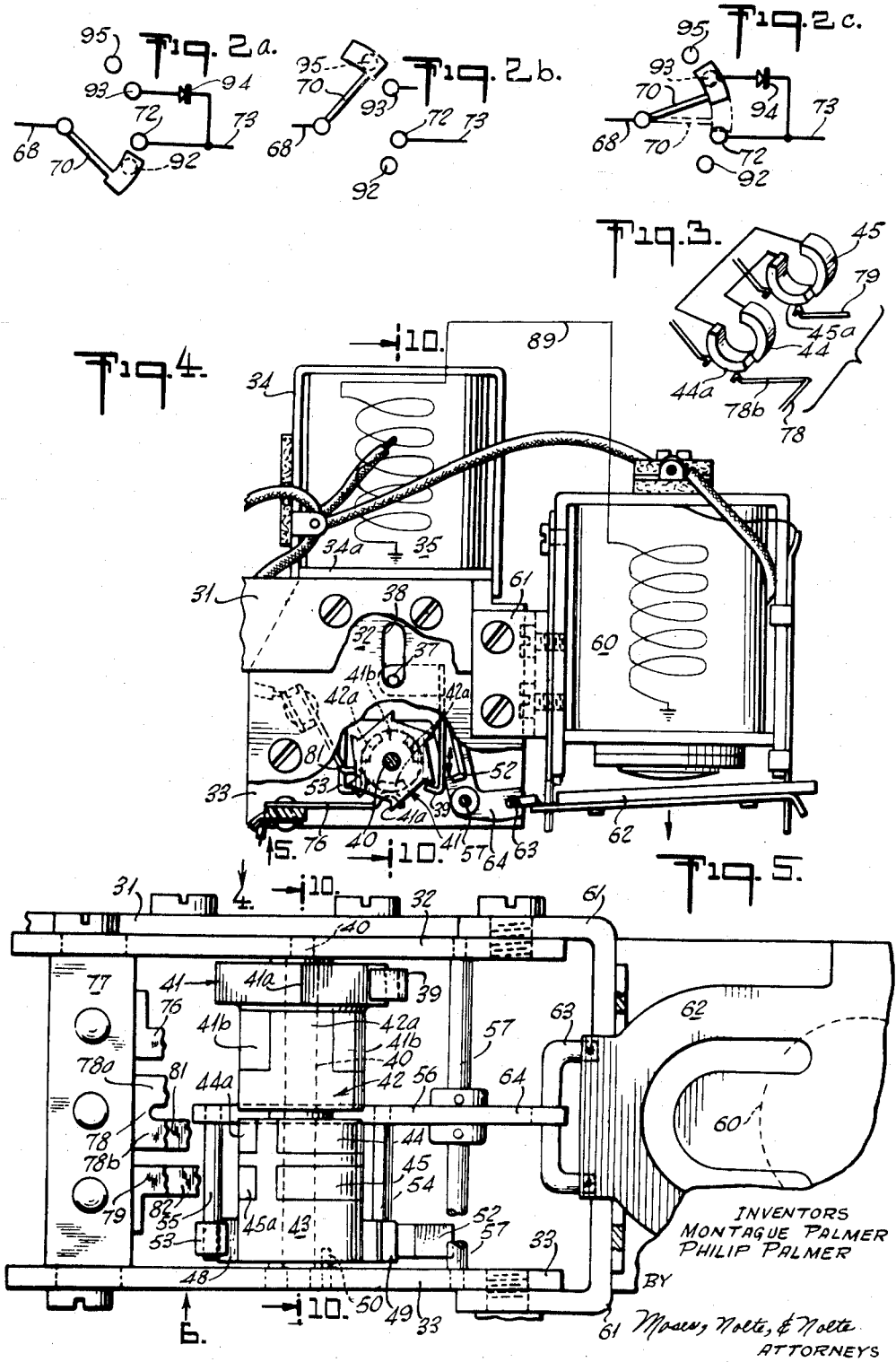
INVENTORS
MONTAGUE PALMER
PHILIP PALMER
BY
Mason, Nolte, & Nolte
ATTORNEYS

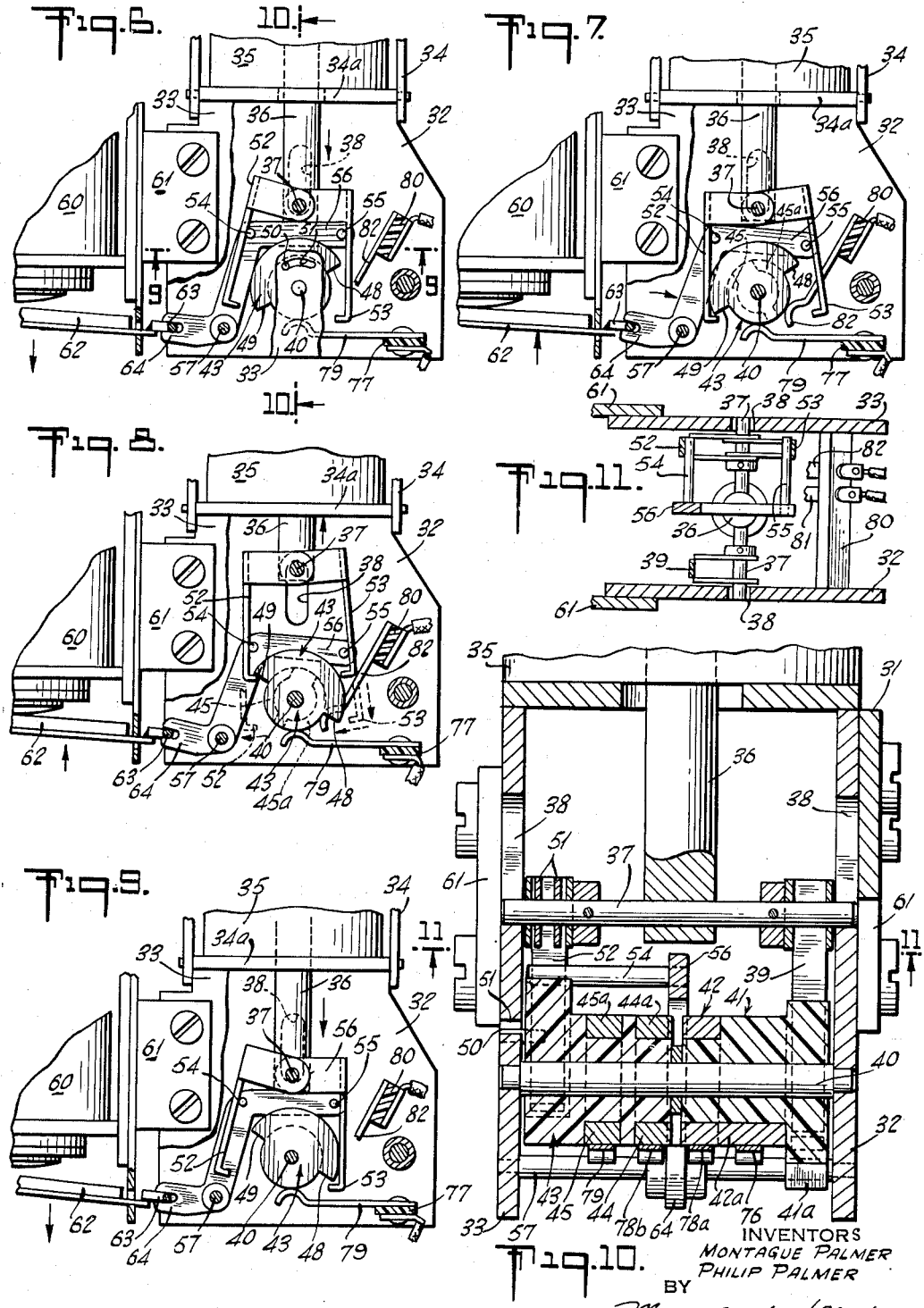

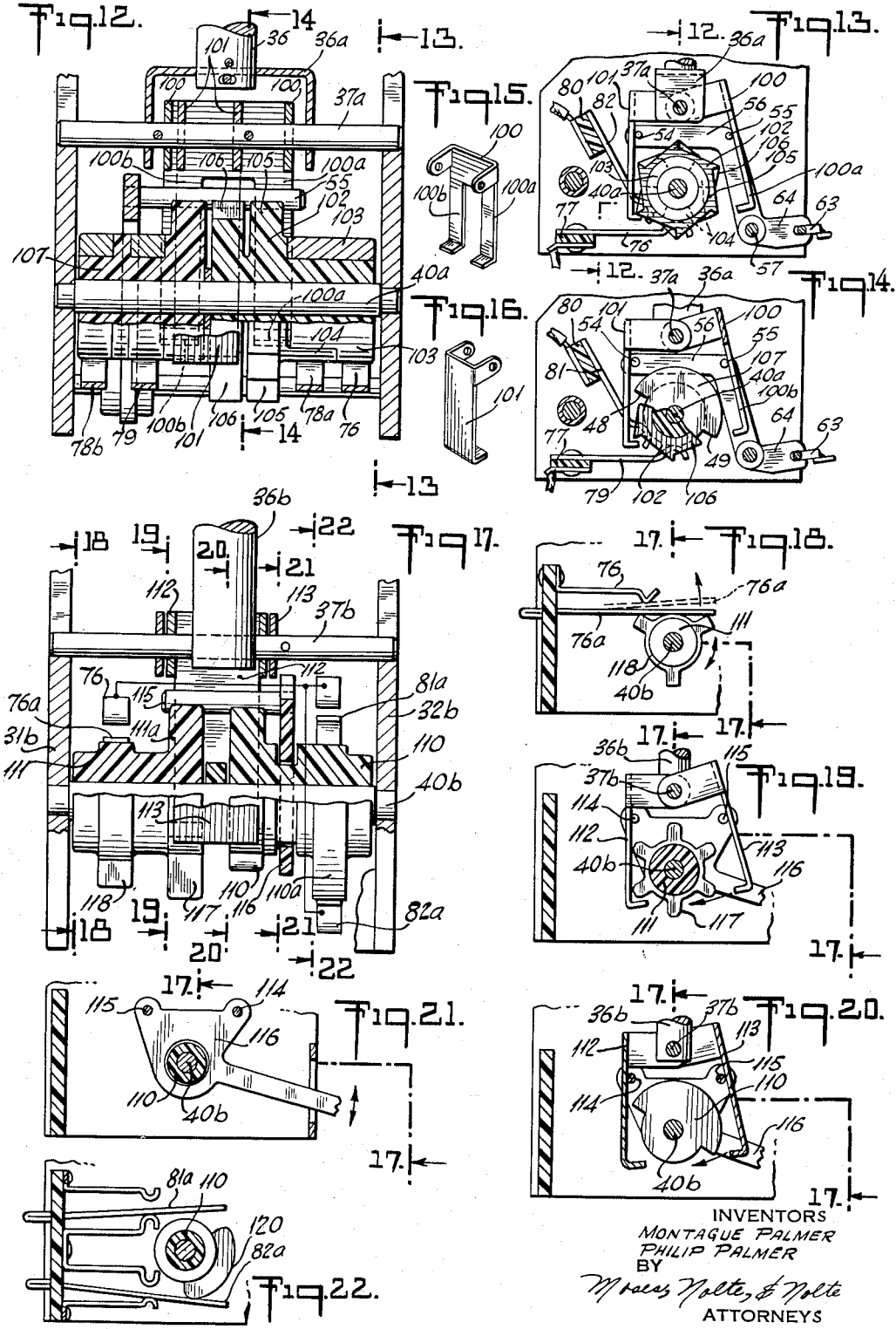

Dec. 13, 1960  M. PALMER ET AL  2,963,985
SELECTIVE ELECTRIC MOTOR CONTROL SYSTEM
Filed July 1, 1957  5 Sheets-Sheet 5
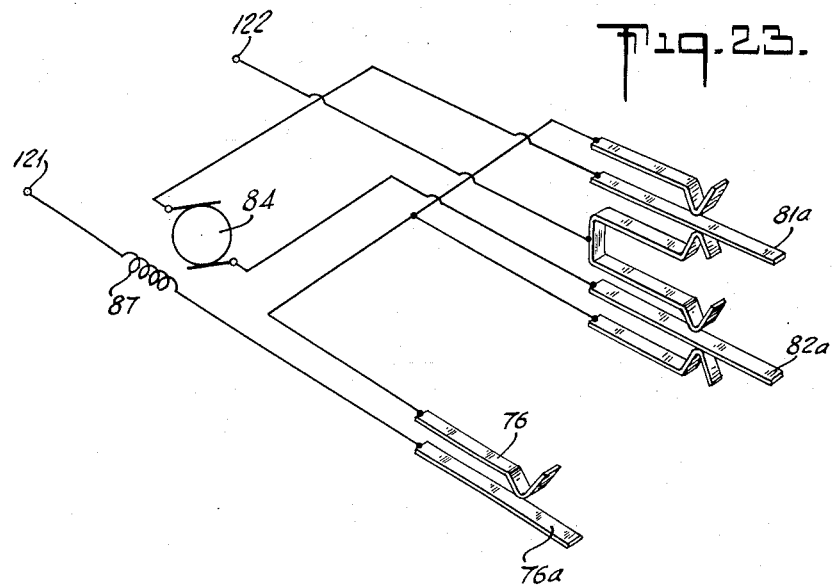
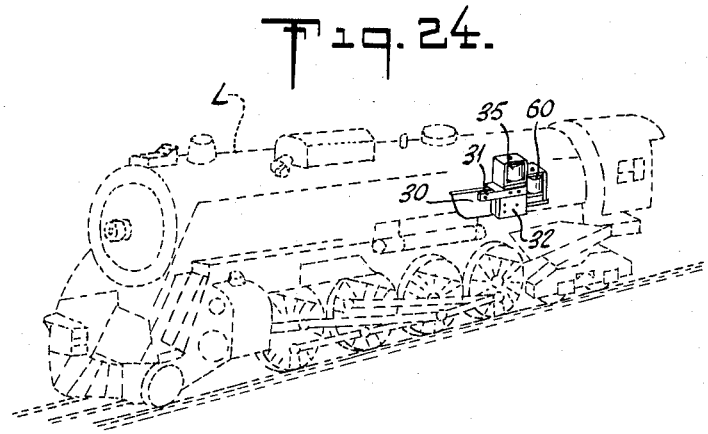
INVENTORS
MONTAGUE PALMER
PHILIP PALMER
BY
Moses, Noete, & Nolte
ATTORNEYS

United States Patent Office 2,963,985
Patented Dec. 13, 1960

2,963,985

SELECTIVE ELECTRIC MOTOR CONTROL SYSTEM

Montague Palmer, White Plains, and Philip Palmer, Great Neck, N.Y., assignors to The Lionel Corporation, New York, N.Y., a corporation of New York Filed July 1, 1957, Ser. No. 669,344

14 Claims. (Cl. 104—151)

The present invention relates to electrical controls and is more particularly directed to controls for electric motors.

In the art it is common to effect the reversal of direction of an electric motor by reversing the field winding relative to the armature winding and to attain such reversal by a double throw switch usually of the step-by-step type such, for example, as those shown in Sparks Patent 1,622,815 or in Bonanno Patent 2,155,343. Such step-by-step switches have a commutator which is advanced one step for each time the control circuit is opened and reclosed so that at the end of a forward or reverse run of the motor, the circuit for controlling the motor is restored although the motor itself is disconnected, so that various devices connected to the circuit may be operated while the motor is not running.

Upon opening and reclosing the control circuit therefor while the motor is operating the step-by-step switch first operates to disconnect the motor circuit while leaving the remainder of the circuit connected. Upon the next opening and closing of the circuit, the step-by-step reversing switch for the motor is shifted so that it runs backward instead of forward or vice versa.

In such switches two pulses of current are necessary to effect change of rotation direction, and reversal is brought about by such a succession of opening and closing operation. Therefore there is always the likelihood that the motor may be started in an undesired direction.

The present invention contemplates controls for an electric motor such that the operator may always obtain forward operation when desired or reverse operation when desired, regardless of previous operation these operations being attained without affecting the maintenance of circuit energization when the motor is not running.

According to the present invention the controls are arranged so that one can energize the control circuit with alternating current or with a direct current pulse. Whenever the alternating current is first applied, the motor will operate in a forward direction, but whenever the control circuit is first energized by a direct current pulse, followed by an opening of the circuit and reclosing against with a direct current pulse, and then energized with alternating current, the motor will operate in a reverse direction.

It is thus always possible according to the present invention, by repeated opening and closing of the control circuit, to secure forward rotation only when no direct current has been supplied to the control circuit and to obtain backward or reverse operation by a prior application of a direct current pulse and by opening and closing the circuit.

When suitable alternating current voltage is applied to the motor circuit the manipulation of a simple direction selector switch may be manipulated repeatedly to stop the motor or start it in the selected direction.

In one specific embodiment of the invention the control circuit is applied to a toy railroad and the controls are located externally to the tracks for supplying them with either alternating current, or a direct current pulse, the motor and the switching apparatus therefor being included in the locomotive.

Other and further objects will appear as the description proceeds.

The accompanying drawings show, for purposes of illustrating the present invention, three forms in which the invention may take form, it being understood that the drawings are illustrative of the invention rather than limiting the same.

In the drawings:

Fig. 1 is a wiring diagram indicating the control circuit for a motor, the parts being shown in open circuit relation and conditioned for forward movement upon the mere application of propulsion voltage to the circuit, the full line arrows indicating the movements of the switch parts when the circuit is reclosed;

Figs. 2a, 2b and 2c are fragmentary views which, respectively, illustrate the positions of the direction selector switch lever for stopping the motor after a forward run, for initiating a reverse operation, and for stopping the motor after a reverse run;

Fig. 3 is a fragmentary view illustrating the reverse switch of the motor circuit, conditioned for reverse operation;

Fig. 4 is a side elevational view of one form of control taken in the direction of the arrow 4 of Fig. 5 in the position attained at the end of a forward run, parts being broken away and parts in section;

Fig. 5 is an inverted plan view of the device taken at a larger scale in the direction of the arrow 5 of Fig. 4;

Fig. 6 is a side elevational view taken in the direction of the arrow 6 of Fig. 5, parts being broken away;

Fig. 7 is a view similar to Fig. 6 showing certain of the parts in the position to which they are shifted by the direct current magnet antecedent to a reverse operation and before the solenoid plunger has been raised;

Fig. 8 is a view similar to Fig. 7 showing the position of the parts after the solenoid has operated and the reverse switch has operated;

Fig. 9 is a view similar to Fig. 8 showing the position of the parts at the end of a reverse run;

Fig. 10 is a vertical, sectional view on a larger scale taken on the line 10—10 of Figs. 4, 5 and 6, looking in the direction of the arrows;

Fig. 11 is a fragmentary, inverted plan view on the line 11—11 of Fig. 10;

Fig. 12 is a vertical section on the line 12—12 of Figs. 13 and 14, illustrating a modified form of construction for the start, stop and reversing switch, the device being deenergized;

Figs. 13 and 14 are vertical sectional views on the lines 13—13 and 14—14 of Fig. 12;

Figs. 15 and 16 are perspective views of the pawls in the construction of Fig. 12;

Fig. 17 is a vertical section on the line 17—17 of Figs. 18–21, inclusive, illustrating a still further modified construction for the start, stop and reversing switch;

Figs. 18–22, inclusive, are fragmentary sections on the lines 18—18 to 22—22, respectively, of Fig. 17;

Fig. 23 is a wiring diagram for the switch of Figs. 17–22; and

Fig. 24 is a perspective view of a toy locomotive equipped with electrical controls according to the present invention.

A non-magnetic frame having spaced front and rear plates 32 and 33 (Fig. 4) is secured to a solenoid frame 34, 34a. The frame 34 carries the solenoid coil 35, grounded to the frame and connected to the power supplying wire 89. This solenoid coil, when energized, acts on a plunger 36, which normally is gravity biased to the lower position, as shown in Figs. 4, 6, 7, 9 and 10 to lift it to an upper position, as indicated Fig. 8. This plunger 36 carries a cross pin 37 whose vertical movement is limited by slots 38, 38 in plates 32 and 33. The cross pin 37 carries a pawl 39 which hangs down by gravity and is gravity biased in a clockwise direction, as viewed in Fig. 4.

Below the cross pin 37, the frame pieces 32 and 33 carry a shaft 40. This shaft 40 acts as a bearing for a rotor having an insulating part 41 and a conducting part 42. The insulating part 41 has ratchet teeth 41a adapted to cooperate with the pawl 39. The hub portion 41b of the insulating part 41 is notched, as more clearly indicated in Fig. 1, to receive three conducting segments 42a of the conducting part 42. The ratchet has six teeth. Hence, upon advancing the rotor 41, 42, the conducting strips 42a and the insulating areas 41b alternately shift to the same position and open and close the propulsion motor circuit.

The shaft 40 also acts as a bearing for contact carrier 43 which carries four conducting segments 44, 44a, 45, 45a. The segment 44a is connected to segment 45, and the segment 45a is connected to the segment 44 by conductors 46 and 47 (see Fig. 1). The contact carrier 43 also has large diameter portions and small diameter portions connected by two shoulders 48 and 49, shown at 180° from one another. Angular movement of the contact carrier 43 is limited by a pin 50 (Fig. 6) which enters an arcuate slot 51 in the frame plate 33. The contact carrier 43 is positioned as shown in Figs. 6 and 8 by one or the other of two pawls 52 or 53 pivotally carried on the pin 37 at the lower end of the plunger 36. These pawls normally drop into the positions shown in Figs. 4, 6, 7 and 9 and rest on two pins 54 and 55 carried on a bell crank lever 56 pivoted at 57.

Should the reversing switch contact carrier 43 be in the position shown in Figs. 1, 4, 5, 6 or 9, the pawl 52 is held by the pin 54 away from the shoulder 49 on the member 43, and the lifting of the plunger 36 will have no effect on the member 43. Should the bell crank member 56 be shifted, however, by means to be described, to the position shown in Fig. 7, it will be noted that the pawl 52 is now released so that its lower end swings under the shoulder 49 of the member 43. When the plunger 36 is lifted in a manner to be described, the pawl 52 engages the contact carrier 43 and shifts it clockwise, as viewed in Figs. 7 and 8 to the position of Fig. 8. This will shift the conducting straps 44, 44a, 45, 45a from the position of Fig. 1 to the position of Fig. 3.

The shifting of the bell crank member 56 from the position of Fig. 6 to the position of Fig. 7 is effected by the D.C. electromagnet 60 carried on a bracket 61 secured to the frame plate 32. This electromagnet may be of the type shown in Bonanno Pat. 2,155,343 Figs. 5, 6 and 7, and is so designed that, when alternating current up to a predetermined maximum voltage is applied to it, it does not shift the armature. When, however, a direct current voltage is applied, the armature 62 will be attracted. Thus, when the electromagnet 60 is completely deenergized or supplied with alternating current alone, the armature is down, as in Figs. 4, 6 and 9; and when it is energized with direct current, the armature 62 of the magnet is up, as shown in Figs. 7 and 8. The end 63 of the D.C. armature has a lost motion pin and slot connection with the end 64 of the bell crank 53, so that the bell crank is shifted when the armature shifts.

Reference is now made to the wiring diagram of Fig. 1. Alternating current of suitably low voltage is supplied by the secondary coil S of the transformer T. One end 65 of the secondary coil S is connected by wiring 66 with solenoid coil 35 via a conductor 67. A variable voltage may be supplied by an arm 68 movable over the bared secondary coil as usual. This arm 68 is connected to a swingable contact conducting lever 70 biased to a predetermined central position, as for example, by opposed springs 71, 71. When in this position, it engages a contact 72 which is connected by wire 73 and line 74 to solenoid 35. Line 74 also connects to wires 89 and 76' which lead to a conducting spring brush 76 mounted on an insulating cross piece 77 (Fig. 5) and bearing on the conducting ring 42 on hub of the rotor 41, and, therefore, will engage either a conducting segment 42a or insulating segment 41b.

The insulating cross piece 77 carries a bifurcated contact element 78 having one spring conducting brush 78a which bears on the end of conducting ring 42 and another conducting brush 78b which bears on one or the other of the reversing switch segments 44 or 44a. The cross piece 77 also carries a spring conducting brush 79 which bears on one or the other of the reversing switch segments 45, 45a.

A second insulating cross piece 80 carries two spring conducting brushes 81 and 82, the brush 81 being adapted to bear upon the segment 44 or 44a, and the brush 82 being adapted to bear upon the segment 45 or 45a. The brush 81 is connected by wire 83 with the armature 84 of the propulsion motor. The armature is connected by wire 85 with the brush 82. The brush 79 is connected by wire 86 with the field 87 of the motor.

Coil 35 is connected to the coil 60 by wire 90. These coils are usually grounded to the frame of the apparatus, but the return is here indicated by wiring 91.

It will thus be seen that, when alternating current of the proper voltage for operating the motor is supplied through variable voltage contact 68 and normally closed switch 70, 72, alternating current will flow through the coil 35 and immediately cause this coil to lift the plunger 36 and rod 37 and shift the rotor, formed of parts 41, 42 through 60°, thereby opening the motor circuit. Should the circuit then be reclosed, the ratchet and pawl mechanism will advance the rotor another 60° and restore current to the propulsion motor, and it will operate in the direction as determined by the direction in which lever 70 is moved.

The selector switch lever 70 is adapted to be shifted from the position of Fig. 1 to the position of Fig. 2a, where it bears only on the insulated contact button 92 and opens circuit 73, 74, etc. Hence, a movement of the contact lever 70 back and forth between the positions of Figs. 1 and 2a will effect repeated forward operation of the propulsion motor.

The lever 70 may, however, be shifted in the opposite direction, as in Fig. 2c, to place it on a contact 93 or further to the position of Fig. 2b and then released. The contact 93 is connected to bus line 74 through a rectifier 94, and whenever the contact 70 is on contact 93, the rectifier 94 transmits to the control circuit a direct current. This direct current will operate electromagnet 60 to lift the armature 62 and shift the bell crank member 56 from the position of Fig. 6 to the positions of Figs. 7 and 8. This movement will lift the pawl 53 away from the oscillating switch carrier 43 and permit the pawl 52 to swing under the shoulder 49 of the switch carrier 43, as shown in Fig. 7. The circuit may then be opened by shifting lever 70 to insulated contact 95, as shown in Fig. 2b, opening the circuit and allowing coil 35 to be de-energized and pawl 39 to drop. The armature 62 of electromagnet 60 will remain up due to residual magnetism to hold the shift lever 56 and pawls 52 and 53 in position for reverse operation by solenoid 35.

When, however, the contact lever 70 is released, the springs 71 bias it back to its neutral position and in so doing causes the following effects. First, when it contacts contact 93 a direct current is again introduced which not only strengthens the magnetic hold on the direct current magnet armature 62 holding pawl 53 away from shoulder 48, but which also raises solenoid plunger 36. In so doing, it lifts the pawls 39, 52 and 53. When pawl 52 shifts from the position of Fig. 7 to the position of Fig. 8, it engages shoulder 49 and shifts carrier 43 to move segments 44, 44a, 45 and 45a from the position of Fig. 1 to the position of Fig. 3 and, as will be obvious from tracing the circuit will have reversed the motor armature relative to the motor field. The solenoid 35 will also have shifted the rotor 41 and ring 42 one step to thereby either disconnect the motor or reconnect the motor to the power supply circuit. When the contact lever 70 reaches its neutral position on contact 72, only alternating current will be impressed on the circuit and not only will plunger 36 remain at its uppermost position but the alternating current will neutralize the residual magnetism in magnet 60 permitting its armature 62 to drop by gravity, thus shifting the bell crank lever 56 and so moving pawl 53 away from shoulder 48. This moving of pawl 53 will cause no movement of any circuit controlling parts, the reversing switch remaining in reverse position. Contact lever 70 is made broad enough to cover contacts 93 and 72 at the same time to avoid interruption of the electric current.

Should the bus line 67, 74 be deenergized with the motor running in reverse the motor will, of course, stop. The next time it is energized, the rotor 41, 42 will be advanced a step. Should it be deenergized and again energized, first with direct current and then with alternating current, as by suitable manipulation of control lever 70 from contact 95 to contacts 93 and then 72, the motor will again turn backwards. Thus, whenever the contact lever 70 is pushed to open the circuit and then to select the rectifier circuit before applying alternating current, reverse rotation of the motor may be had.

Should the circuit closing occur in any other manner than through the selector switch which supplied the direct current impulse, the motor will operate in a forward direction.

It will be noted that, during the entire course of backward rotation, the plunger 36 is in the upper position of Fig. 8 and the contact carrier 43 in the clockwise position shown in Fig. 8. When the plunger 36 has dropped to the position of Figs. 4 and 9, the pawl 53 will now be under the shoulder 48 of the reversing switch carrier 43 so that, when the plunger 36 is again lifted, 53 engages 48 and returns the contact carrier 43 to the forward position.

The construction shown in Figs. 12 to 16, inclusive, is similar to the construction previously described. It, however, uses two pawls instead of three for effecting operation of the make-and-break rotor corresponding with the parts 41, 42 previously described and the reversing switch contact carrier 43 previously described.

In these figures, the same plunger 36 is employed. It is connected by a yoke 36a with a cross pin 37a similar to the cross pin 37. This cross pin 37a carries a double pawl 100 and a single pawl 101. Below the cross pin 37a is a shaft 40a similar to the shaft 40. Mounted on this shaft is an insulating rotor 102 carrying a conducting ring 103 with conducting segments 104 in the same manner as shown at 41, 42 in Figures 1 to 11. This rotor has two ratchets 105, 106 each with six teeth, the teeth on each ratchet facing opposite those on the other. The portion 100a of the pawl 100 is adapted to cooperate with the teeth of ratchet 105 to turn the rotor 102 in a counterclockwise direction when the plunger 36 is raised. The pawl 101 engages the ratchet teeth 106 to turn the rotor in a clockwise direction each time the plunger 36 is lifted. Only one of the pawls 100a or 101 can engage the ratchet teeth of the rotor 102 at a time. One or the other is held out of engagement with the ratchet teeth by reason of the bell crank lever 56 with pins 54 and 55, as above described.

The shaft 40a also carries an insulating rotor 107 which may be identical with the rotor 43 and provided with the same arrangement of contacts and shoulders 48, 49. The other arm 100b of the pawl 100 is adapted to cooperate with the shoulder 49 when the bell crank member 56 has been shifted by the application of direct current to the solenoid 60 in the same manner as the pawl 52, previously described, and the pawl 101 cooperates with the shoulder 48 in the same manner as the pawl 53.

This form of construction is provided with contact fingers 78a, 76, 78b and 79 similar to those of the previous figures and connected into the same circuit.

In the construction of Figures 12–14, inclusive, on-and-off rotor 102 is turned forward in 60° steps when the motor is always running forward and is turned back and forth through a 60° angle when the motor is repeatedly operated for reverse rotation. As the rotor 102 is merely an on-and-off switch, it makes no difference in which direction it is turned.

The construction shown in Figs. 17–22 is similar to that shown in Figs. 12–16. It uses two identical pawls 112, 113 which may be like pawls 100 and 101 previously described. The pawls are carried by a cross pin 37b connected to a plunger 36b, similar to plunger 36.

A shaft 40b is mounted in a frame 31b, 32b and is provided with an insulating rotor 110. The rotor carries a reversing switch cam 110a, like cam 43, having two pair of shoulders adapted to be engaged by pawls 112, 113. A second insulating rotor 111 on shaft 40b includes a ratchet wheel 117 have six teeth adapted to be engaged by either one of the pawls. Bell crank lever 116 has pins 114, 115 for holding one of the pawls out of engagement with ratchet wheel 117 and reversing switch cam 110a. Lever 116 is adapted to be shifted by magnet 60 in the same manner as bell crank member 56 described above, and thus determines in which direction cam 110a and ratchet wheel 117 will turn when plunger 36b is raised. Rotor 111 also includes a three position cam wheel 118 for operating an on-off switch 76a in the same manner as switch 76 described above. Rotor 111 is turned in 60° steps in either direction, depending on whether D.C. solenoid 60 is energized or unenergized, and in alternate 60° positions supplies or cuts off the alternating current to the motor. Switching cam 120 on rotor 110 assumes one position or another when plunger 36b is raised, depending on the condition of solenoid 60. Thus cam member 120 operates reversing switches 81a, 82a as shown in Fig. 22. The circuit connections between the motor and switches is as shown in Fig. 23. The field winding 87 of the motor is connected between one power input terminal 121 and switch 76a. The other input terminal 122 is connected to reversing switch 81a, 82a, and armature 84 is connected between the movable arms of reversing switch 81a, 82a. The operation of the construction shown in Figs. 17–23 will be apparent from the above description thereof.

The control systems described above are suitable for controlling an electric locomotive L, Fig. 24. The locomotive is positioned on the usual tracks which supply power to it. The tracks correspond to conductors 67 and 74, Fig. 1. The power supply and control apparatus T, 70, 94, 66, 73, etc., shown in the upper portion of Fig. 1 is external to the tracks and locomotive. The frame 34, 34a of solenoid 35 is mounted on a portion 30 of the locomotive by front and rear plates 32 and 33. The locomotive also carries the motor, magnet 60 and the switching apparatus and wiring shown in the lower portion of Fig. 1. The propulsion motor is geared to the locomotive wheels in the usual manner. It will be evident from the description given heretofore that operation of lever or switch arm 70 provides complete control for forward and backward running and stopping of the locomotive. After stopping the locomotive, switch arm 70 will be moved by springs 71 to close on contact 72 and therefore will supply full alternating voltage to the locomotive circuit to permit the operation of lamps, whistles, and other train-carried accessories.

It will be apparent to those skilled in the art that many modifications of the apparatus disclosed may be made

What is claimed is:

1. An electric motor control system comprising an electric motor having a field winding and an armature, a circuit including a solenoid and a direct current magnet connected in parallel, means for selectively supplying to said circuit alternating current and direct current and interrupting the supply of said currents, said direct current magnet being incapable of operating on said alternating current but being operable by said direct current and having sufficient residual magnetism to remain operated for a given time after the current is interrupted; off-on switching means mechanically connected to said solenoid for successively connecting and disconnecting said current supply means from said motor; motor reversing two position switch means and circuit means connecting said motor through said reversing switch means to said current supply means for controlling the direction of rotation of said motor; adjustable means connecting said reversing switch means to said solenoid for operating said reversing switch means by said solenoid to one position or the other; and control means responsive to said direct current magnet for adjusting said adjustable connecting means for determining the position to which said reversing switch means is operated by said solenoid.

2. An electric motor control system according to claim 1, wherein said current supply means includes an alternating current source, a rectifier connected to said source, and manual switching means for selectively connecting said circuit to said source either directly or through said rectifier.

3. An electric motor control system according to claim 1, wherein said manual switching means includes means for biasing it for direct connection of the circuit to the source.

4. An electric motor control system according to claim 1, wherein said circuit includes a pair of current supply conductors and said means for supplying current is an alternating current source having one terminal connected directly to one of said conductors, said source having a second input terminal, a control switch having a movable switch arm connected to said second terminal, means for maintaining said switch arm biased to a third terminal connected to said other conductor, a rectifier connecting said other conductor to another terminal of said control switch, said control switch having at least one other operating position in which the switch arm is disconnected from said other conductor, whereby said control switch is capable of supplying alternating current, direct current or no current to said other conductor.

5. An electric control system according to claim 1, wherein said off-on switch means comprises a step-by-step rotary switch and means for stepping said switch comprising a ratchet wheel connected to said switch, a pawl engaging said ratchet wheel for rotating said ratchet wheel in one direction, said solenoid having a plunger connected to said pawl.

6. An electric control system according to claim 1, wherein said off-on switch means comprises a step-by-step rotary switch, a ratchet wheel connected to said switch, means including a pair of pawls for engaging said ratchet wheel and rotating said ratchet wheel in one direction or the other, said solenoid having a plunger connected to said pawls, and means connected to said direct current magnet for disconnecting one of said pawls from said ratchet wheel when said direct current magnet is not energized and disconnecting the other pawl when the direct current magnet is energized.

7. An electric control system according to claim 1, wherein the means connecting the motor reversing switch means to the solenoid includes a ratchet wheel, means including a pair of pawls for rotating said ratchet wheel in opposite directions and means connecting said pawls to the plunger of said solenoid; and wherein said control means includes means for maintaining one or the other of said pair of pawls disengaged from said ratchet wheel.

8. An electric control system according to claim 1, wherein the on-off switch means includes a rotatable switch having a rotary shaft and a ratchet wheel fixed to said shaft and the means connecting the motor-reversing switch to the solenoid includes a ratchet wheel, a pair of pawls engaging opposite sides of the circumference of both ratchet wheels, and means connecting said pawls to the plunger of said solenoid, the control means including means for disengaging either of said pawls from said ratchet wheels.

9. An electric motor control system comprising a motor having a field winding and an armature; a circuit including a solenoid and a direct current magnet connected in parallel; means for selectively supplying to said circuit alternating current and direct current and interrupting the supply of said currents, said direct current magnet being incapable of operating on said alternating current but being operable by said direct current and having sufficient residual magnetism to remain operated for a given time after the current is interrupted; off-on switching means mechanically connected to said solenoid for alternately connecting and disconnecting said current supply means from said motor; motor-reversing two-position switch means and circuit means connecting said motor to said current supply means for controlling the direction of rotation of said motor; adjustable means connecting said reversing switch means to said solenoid for operating said reversing switch means in either of two directions; and control means connected to said adjustable connecting means and responsive to said direct current magnet for determining the position assumed by said adjustable connecting means when said solenoid is energized.

10. An electric motor control system comprising a motor having a field winding and an armature, a circuit including a solenoid and a direct current magnet; means for supplying alternating current and direct current to said circuit, said direct current magnet being incapable of operating on said alternating current but being operable by said direct current and having sufficient residual magnetism to remain operated for a given time after the current is interrupted; off-on switching means connected and responsive to said solenoid for alternately connecting and disconnecting said current supply means from said motor; motor reversing two-position switch means connecting said motor to said current supply means for controlling the direction of rotation of said motor; means connecting said reversing switch means to said solenoid for operating said reversing switch means to one position or the other; and adjustable control means responsive to said direct current magnet for determining the position to which said reversing switch means is operated by said solenoid; and means including switch means for supplying alternating current to said circuit and operable in one direction for opening said circuit and operable in another direction for supplying a direct current and for interrupting said direct current upon further movement of said switch means in said other direction.

11. An electric motor control system including an electric motor, means for supplying direct and alternating current including switching means having right and left open circuit and direct current supplying positions and a center alternating current supplying position, means connected to said switching means for alternately de-energizing and energizing said motor for rotation in one direction in response to successive returns of said switching means to its center position after operations thereof to its position and means connected to said switching means for alternately de-energizing and energizing said motor and effectively reversing the current supply to the motor for changing its direction of rotation in response to successive returns of said switching means to its center position after operations thereof to its direct current supplying position.

12. An electric motor control system comprising a motor having a field winding and an armature, means for selectively supplying alternating current and direct current to said circuit and interrupting the supply of said currents, off-on switching means responsive to successive applications of alternating current for alternately connecting and disconnecting said curret supply means from said motor, motor-reversing alternating current operated switching means connecting said motor to said current supply means for controlling the direction of rotation of said motor, and control means connected to said current supplying means and responsive to direct current for determining the position to which said reversing switching means is operated.

13. A toy railroad control system comprising a locomotive and tracks therefor, a motor mounted in said locomotive and connected to the wheels thereof, said motor having a field winding and an armature, means outside said locomotive for selectively supplying alternating current and direct current to said tracks and interrupting the supply of said currents, off-on switching means in said locomotive responsive to successive applications of alternating current for alternately connecting and disconnecting said current supply means from said motor, motor-reversing alternating current operated switching means in said locomotive connecting said motor to said current supply means for controlling the direction of rotation of said motor, and control means connected to said current supplying means and responsive to direct current for determining the position to which said reversing switching means is operated.

14. A toy railroad control system comprising a locomotive and tracks therefor, a motor mounted in said locomotive and connected for driving the same, said motor having a field winding and an armature, a circuit located in said locomotive and connected to said tracks including a solenoid and a direct current magnet connected in parallel, means outside said locomotive for selectively supplying alternating current and direct current to said tracks, and interrupting the supply of said currents, said direct current magnet being incapable of operating on said alternating current but being operable by said direct current and having sufficient residual magnetism to remaining operated for a given time after the current is interrupted, off-on switching means responsive to successive operations of said solenoid for alternately connecting and disconnecting said current supply means from said motor, motor-reversing two-position switch means and circuit means connecting said motor to said current supply means for controlling the direction of rotation of said motor, means connecting said reversing switch means to said solenoid for operating said switch means to one position or the other, and control means responsive to said direct current magnet for determining the position to which said reversing switch means is operated by said solenoid.

References Cited in the file of this patent
UNITED STATES PATENTS

| | | |
|---|---|---|
| 1,793,087 | Haywood | Feb. 17, 1931 |
| 2,073,443 | Cardoza | Mar. 9, 1937 |
| 2,172,468 | Giaimo | Sept. 12, 1939 |
| 2,274,538 | Ehret et al. | Feb. 24, 1942 |